Feb. 23, 1960 J. K. MASTEN 2,926,333

SYSTEM OF TRAFFIC SIGNALS FOR NON-STOP NETWORKS

Filed Feb. 3, 1955 7 Sheets-Sheet 1

John K. Masten

INVENTOR.

BY Arthur Wright

Attorney

Feb. 23, 1960 J. K. MASTEN 2,926,333

SYSTEM OF TRAFFIC SIGNALS FOR NON-STOP NETWORKS

Filed Feb. 3, 1955 7 Sheets-Sheet 2

John K. Masten
INVENTOR.

BY Arthur Wright
Attorney

John K. Masten

INVENTOR.

BY Arthur Wright
attorney

Feb. 23, 1960 J. K. MASTEN 2,926,333

SYSTEM OF TRAFFIC SIGNALS FOR NON-STOP NETWORKS

Filed Feb. 3, 1955 7 Sheets-Sheet 4

John K. Masten

*INVENTOR.*

BY Arthur Wright

Attorney

John K. Masten
INVENTOR.

BY Arthur Wright
attorney

SYSTEM OF TRAFFIC SIGNALS FOR NON-STOP NETWORKS

Filed Feb. 3, 1955 7 Sheets-Sheet 6

John K. Masten
INVENTOR.

BY Arthur Wright
Attorney

SYSTEM OF TRAFFIC SIGNALS FOR NON-STOP NETWORKS

Filed Feb. 3, 1955 7 Sheets-Sheet 7

John K. Masten
INVENTOR.
BY Arthur Wright
Attorney 2,926,333

SYSTEM OF TRAFFIC SIGNALS FOR NON-STOP NETWORKS

John K. Masten, Elmhurst, N.Y.

Application February 3, 1955, Serial No. 485,935

25 Claims. (Cl. 340—40)

My invention relates particularly to a system or process of operating signals for controlling vehicular and pedestrian traffic, for example urban traffic, although it is applicable to crossing road systems generally to control the traffic thereon. It further supplements my copending application Ser. No. 411,912, filed February 23, 1954, providing additional improvements applicable to the varying needs of different communities.

One object is to provide a close grouping of opposite-direction primary one-way high conductance roads having secondary roads of lesser conductance set between the groups. Another object is to obtain maximum non-stop traffic-conductance in such a way as to conform with the requirements of different locations. In this way, one of the objects is to attain a continuous coordinated flow of traffic on the different crossing roads, in which traffic is allowed to travel at the rate of a large number of interval-spaces on any one road in one given cycle of time, for example 6 or 8 interval-spaces in a 60 second time cycle, while permitting non-stop traffic upon crossing roads, so that there may be attained a continual progression of coordinated traffic, at speeds generally proportionate to block distances, for example at equal speed throughout, as for instance in the Figs. 6 and 7 hereinafter referred to, showing square and oblong blocks, respectively. Furthermore, my invention especially provides pedestrians with adequate time allowance to cross the roads, taking into account the fact that the time cycles of signals and the time of different Go and Stop displays may be of reasonable duration to afford adequate safety in such a manner that the system may still provide reasonable speed to vehicles while also permitting a large total volume of traffic. It is further provided that this may be accomplished in urban sections even where the signal positions are in close proximity to each other despite the fact that, generally, signal proximity within conventional two-way progressive systems dealing only with urban arteries, may be the greatest obstacle to high conductance two-way exchange of traffic. Usually, where successive signals are in close proximity upon one two-way progressive arterial highway, conductance is limited upon the road either by reduced speed or reduced saturation or both, whereas in my system many of the roads in a network of roads may be employed to greater advantage than one such limited road. In other words, it is possible that one two-way progressive artery crossed by a plurality of roads with signals at each crossing, my not convey as much traffic as the average road of two crossing pluralities, as set forth in my invention, wherein one-way roads or both one-way and two-way roads are properly controlled. In accordance with my invention, numerous roads, in certain cases, may be controlled so as to improve average road conductance, whereas heretofore the gridwork patterns of roads adversely affected the average road conductance.

My invention also includes a systematic timing of signals and a systematic interrelationship of said signals throughout a network of roads, in such a manner as to produce a coordinated recurrence of signal indications in different directions upon the roads, so as to make possible in a given area an especially high degree of traffic conductance for large volumes of traffic. In this way, the conductance efficiency of the average road may be high. For example, the conductance efficiency may be particularly high upon two thirds of the roads, even though the signals may be so close as to preclude the possibility of employing only one road of the system as a high conductance two-way independently progressive road.

My invention also includes the provision of similar groups of signals so arranged as to permit the uninterrupted synchronized travel of traffic platoons along the primary and secondary roads and across their intersections. The system also deals with repeatedly operating different signals throughout networks of roads, in such a methodical, synchronized and coordinated order as to regulate and coordinate a progressive flow of traffic in said networks in rapid and voluminous conductance, while at the same time halting non-coordinated traffic not proceeding in accordance with my system.

My invention also contemplates certain principles of sequential signal control in relation to network designs. It may be considered desirable to provide an efficient and inexpensive means for high internal conductance within the cities of the future, by the simple and proper designing of new suburban communities, so that as they grow into each other to eventually become cities, they may integrate with one another in an orderly rather than disorderly manner, thereby avoiding the cause of unnecessary urban congestion brought about by haphazard and poorly planned design not suitable for, or compatible with, efficient progressive traffic systems. Whereas heretofore the traffic engineering concept considered large blocks and distantly separated signals ideal for optimum progression of traffic, as opposed to the commercial need for small blocks, the methods herein are especially useful to increase conductance in locations comprising small blocks. For example, they are especially recommended for such areas as the business centers of Portland, Oregon and Chicago, Illinois.

Ordinarily, the signal at one intersection in a city repeats a cycle of color changes which comprises within a time cycle, a green light for one road and a red light for a crossing road, followed by a change of the lights to favor moving traffic on the second of the crossing directions, or if the crossing is more complex, then by the recurrence of lights for more than two roads, arranged to favor the moving traffic mainly upon one road at a time, although there may be other permissible variations. This complete cycle, with or without overlaps or other intervening lights, such as amber, repeats at this one crossing to provide Go signals in the succession desired. Where such a signal is employed at other nearby crossings it may be coordinated or operated separately through the use of synchronized motors operating, for example, on alternating current, either in simultaneous or coordinated manner at a particular offset in the cycle. Control boxes may be located at each crossing and may frequently comprise within their construction a cam or a group of cams which act upon light shifting elements through a cycle of changes. Among the various adjustments there may be those which control the percentage of time that may be apportioned to the various colored combinations which succeed one another at the one position. Also, there may be a setting which can regulate the offset in a cycle of time, at which the cycle of color changes may repeat, so that each signal at its particular crossing may start its cycle at the particular instant desired and thereafter repeat in the same relation as may be effected, for example, by starting the motor at a calculated instant or division of time while the signal cams are in a given position.

In accordance with my invention, a signal may be operated in conventional manner, but in specially related sequence to other signals within a network of roads. Each signal may start and repeat its cycle of the same length on substantially the particular proportionate division of time as denoted by the numbers at crossings, as shown in the figures, so that the signals, especially the Go lights in the indicated directions, follow repeatedly in specially coordinated order. Traffic is thereby controlled and regulated in progressive movement. The said cycle of time is divided substantially into a number of equally separated points, for example 6 points or 8 points, and each signal is made to repeat its cycle at about that particular division-point of time that is best suited to the requirements of a particular road or crossing so as to provide especially high traffic conductance throughout the system. It may be considered that starting offsets, if regulated in steps, may preferably be of a number, for instance evenly divisible by 6 or 8, such as 24, 96 or 360 within the cycle, and that dials employing such scales may also be more advantageous than percentage dials not divided into 6 or 8 equal increments.

Each signal may be operated by one or more cams rotated upon a shaft which is made to turn at a synchronized speed, as for example by a synchronous motor energized from an alternating current cycle from a common source, so that the leading cam of each particular signal is set to be substantially at a particluar division of the circle at a given instant, for example at a particular sixth or an eighth. Vertical and horizontal volumes of traffic are apportioned according to the span of the cams rotating in conjunction with said particular setting at the particular crossing in the road network.

While my invention is capable of embodiment in many different forms, for the purpose of illustration I have described only certain forms and modifications of my invention and have shown only certain illustrations thereof in the accompanying drawings, in which a one-way road may be shown by a single line, a two-way road may be shown by a double line, a primary road may be shown by a heavier line than a secondary road, and roads having simultaneous non-progressive signal operation are shown by dotted lines. It should be understood, however, that where two-way traffic is shown and described in connection with roads employable for two-way traffic, that vericles may obviously be confined to either way at option if desired and that such employment may be necessary on some streets and may be frequently desirable on others, especially in cases of employment of dual roads of which Figs. 7 and 8 are examples. For convenience, the number at any crossing road position may be considered to indicate an exact instant of time at which a signal repeats its cycle with respect to a common direction, and such numbers will be referred to as time-point positions. However, it should be understood that this is not meant to imply invariably a fixed relation, but that minor deviations are permissible.

Figure 1:
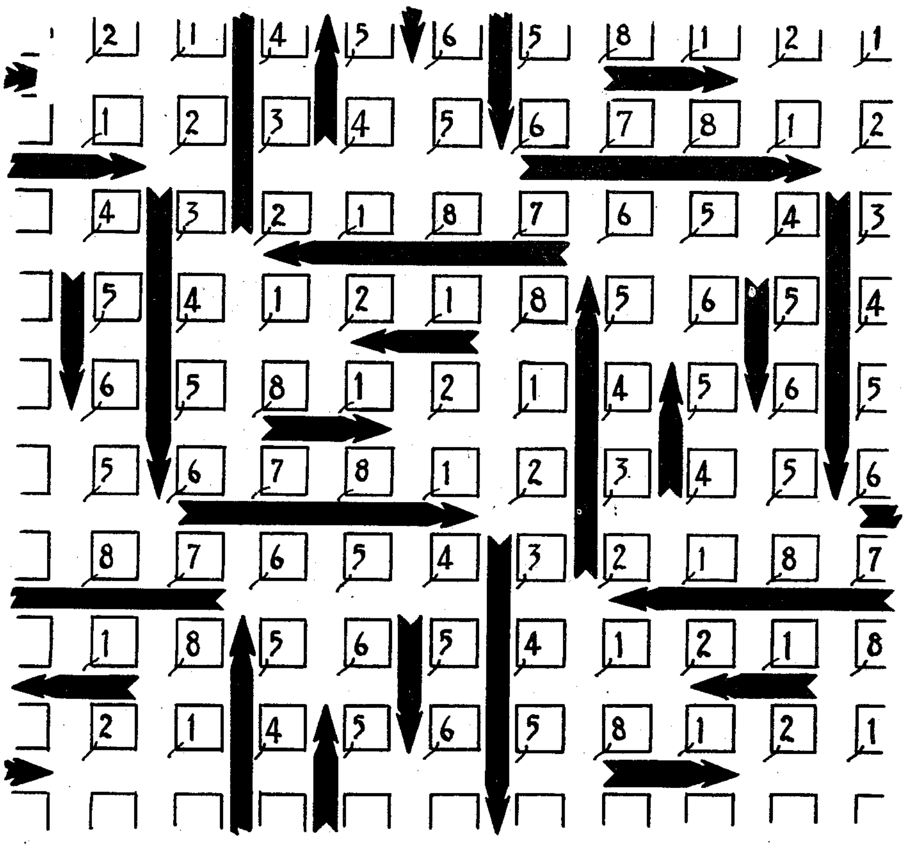
Fig. 1 is a schematic view showing an 8-time division signaling system, and which shows also the positions that the platoons of progressive traffic may occupy at a given instant of time when the time-point position "2" is turning horizontal Go, as applied to an urban block arrangement, the road widths being greatly exaggerated for the purpose of clarity.
Figure 5:
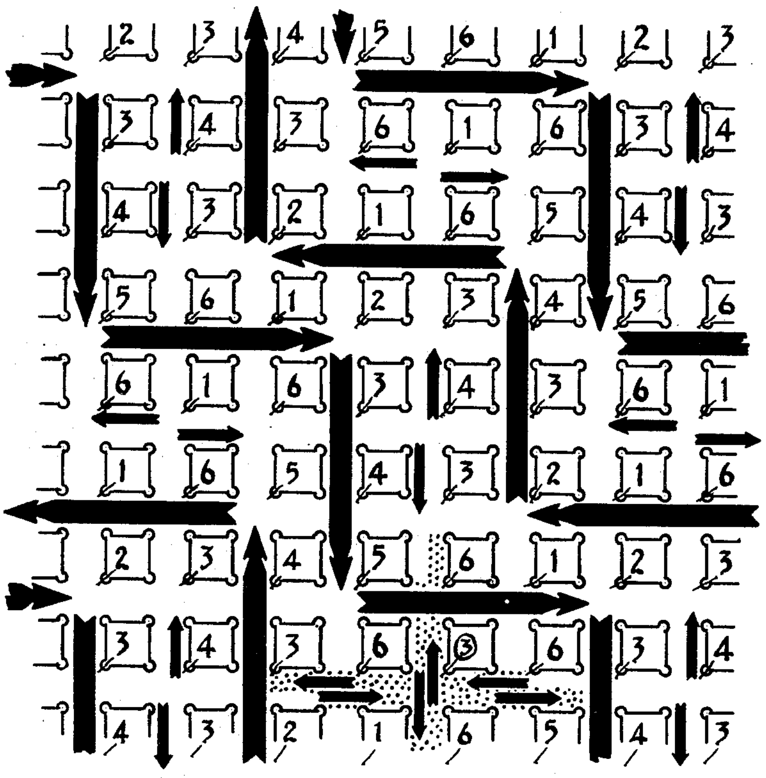

Fig. 5 is a view of an urban block system, as in Fig. 1, except for being arranged to be operated at 6 divisions of the cycle instead of 8. In addition it comprises another different primary and secondary road arrangement, as hereinafter referred to. This includes also, on the lowermost road, an example of a slow zone such as may be effectuated within the system by the substitution of certain signals at any one of the *x* positions shown in Fig. 6.

Figure 6:
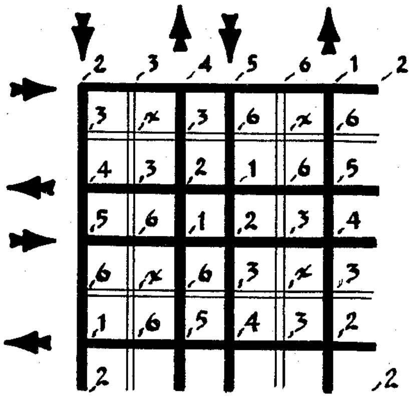

Fig. 6 shows a simple repetitive span, the same as in Fig. 5, but with the platoons omitted. The signals at the time point positions marked *x* may be repeated according to certain optional requirements, as hereinafter referred to.

Figure 7:
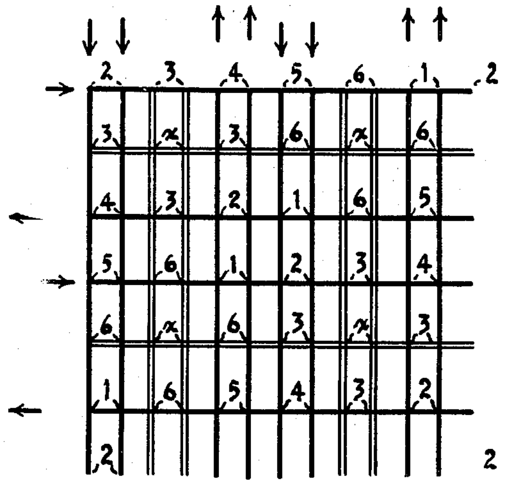

Fig. 7 is a schematic arrangement similar to Fig. 6, but shows the vertical primary and secondary roads in pairs.

Figure 8:
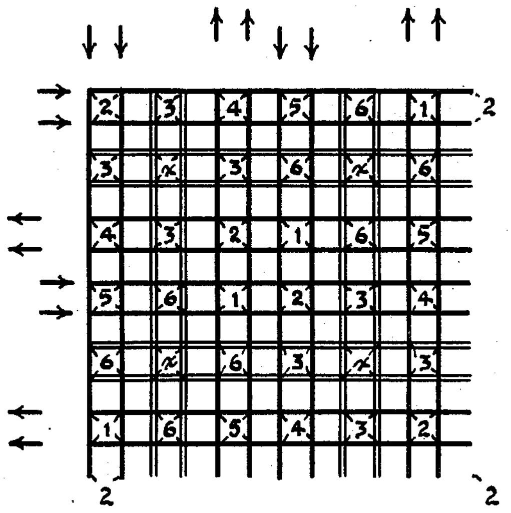

Fig. 8 is another schematic arrangement similar to Fig. 6, but in which both the vertical and horizontal primary and secondary roads are located in pairs.

Figure 9:
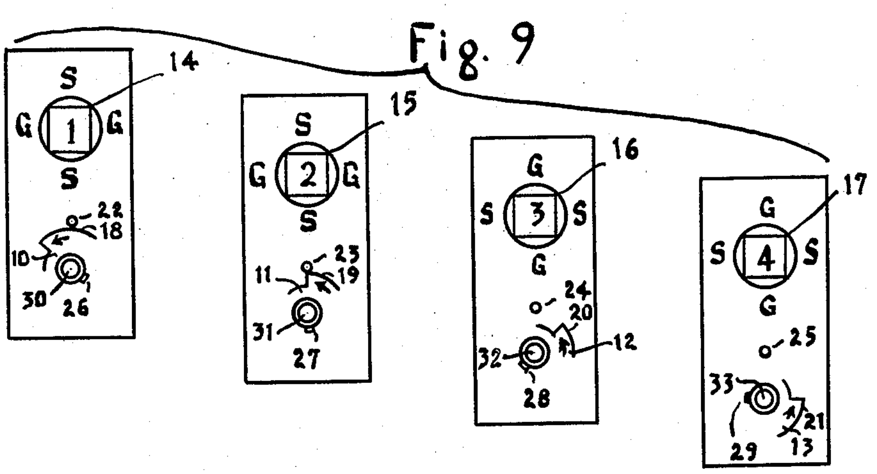

Fig. 9 is a diagrammatic representation of the steps in the actuation of the respective signals through the operation by cams on four of the eight time-point positions in the system in an 8 point time cycle, to illustrate the positions of the signal cams. For example, it shows the horizontal Go cam at the identical moment when the signals bearing the time-point "2" are actuated to horizontal Go, in Figs. 1 to 4. At any one instant, when the leading cam of all the signals "2" have just changed their phase to horizontal Go, in repetition of the time signal, it is apparent that the leading cams of all signals bearing the time point "3" are positioned 45° to the rear so as to actuate the signals to horizontal Go upon the following ⅛ division of the time cycle. The leading cams of the other signals are similarly offset in time and degree one from the other, the offset relation being retained as the cams revolve.

Figure 12:
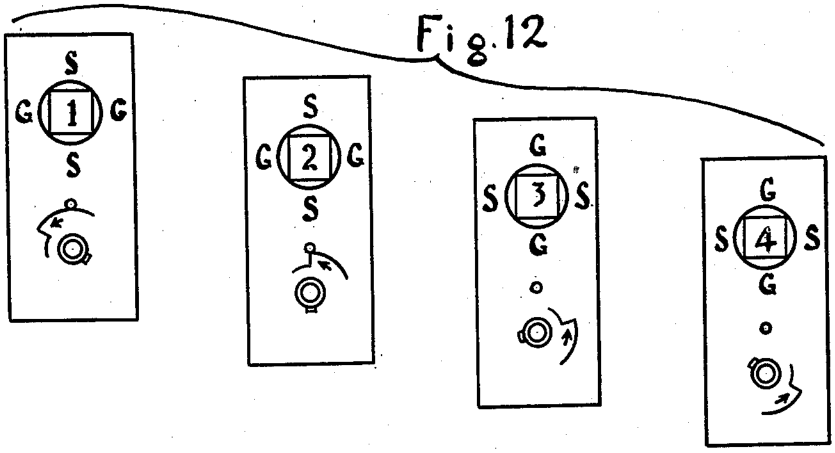
Figure 10:
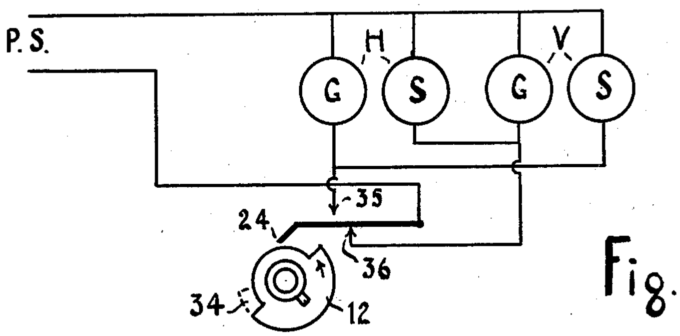

Fig. 10 shows a simple form of wiring diagram which may be used for each particular crossing for operating with respective cams, either in the arrangement shown in Fig. 9 or the arrangement shown in Fig. 12, as applied to Figs. 1, 2, 5, 6, 7 and 8.

Figure 3:
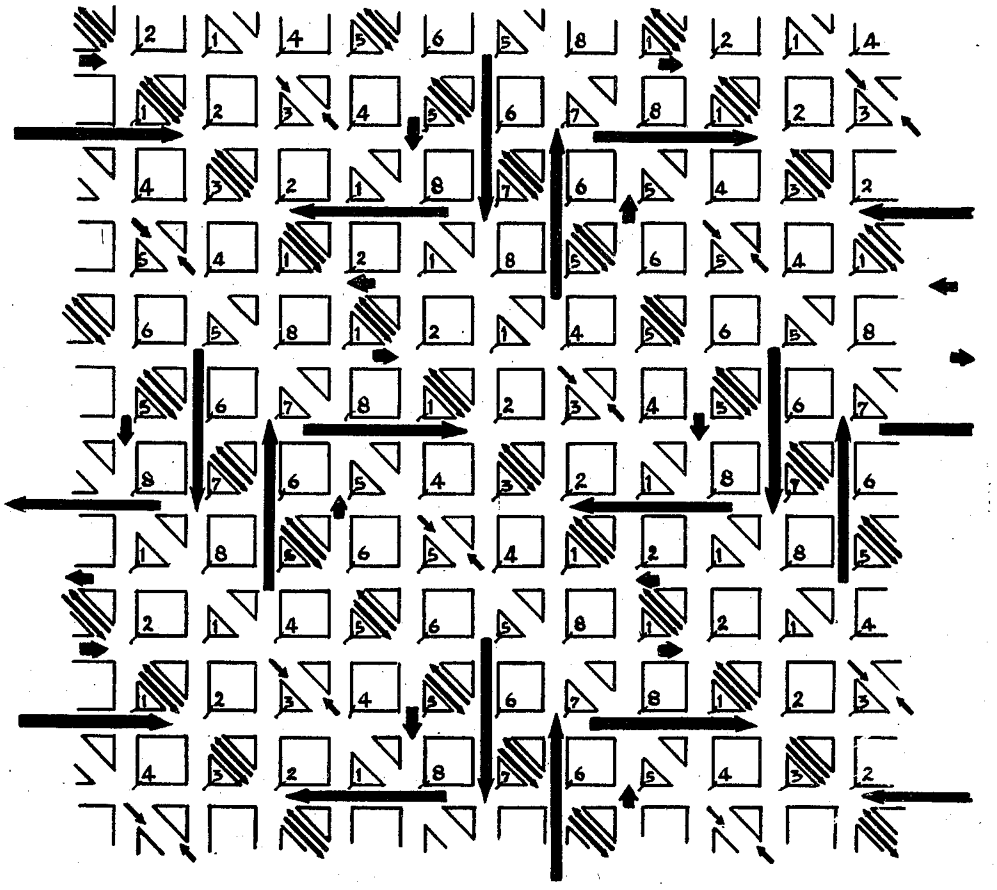
Fig. 3 is a view similar to Fig. 1, except that diagonal roads are shown in addition thereon. Inasmuch as the signal displays therein may permit mainly one of three directions of traffic to travel at a given time, platoons are shown to be shorter.
Figure 4:
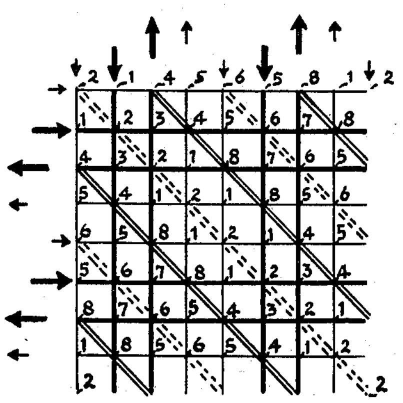
Fig. 4 shows a simple repetitive span, as in Fig. 3, but with the platoons omitted.
Figure 11:
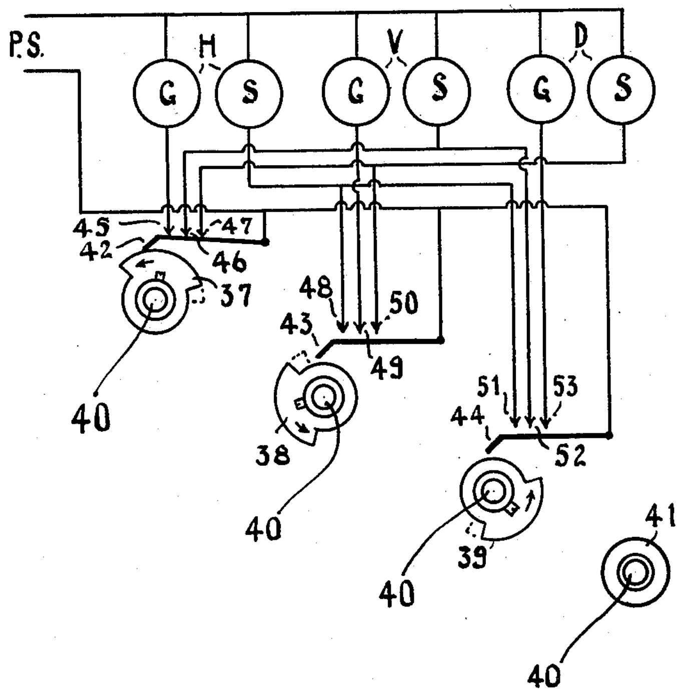

Fig. 11 shows schematically a wiring diagram that may be used in connection with the system shown in Figs. 3 and 4, comprising diagonal roads.

Fig. 12 is a diagrammatic representation similar to that shown in Fig. 9 but is based, instead, upon 6 divisions of the time cycle, the cam settings being positioned 60° apart.

Figure 13:
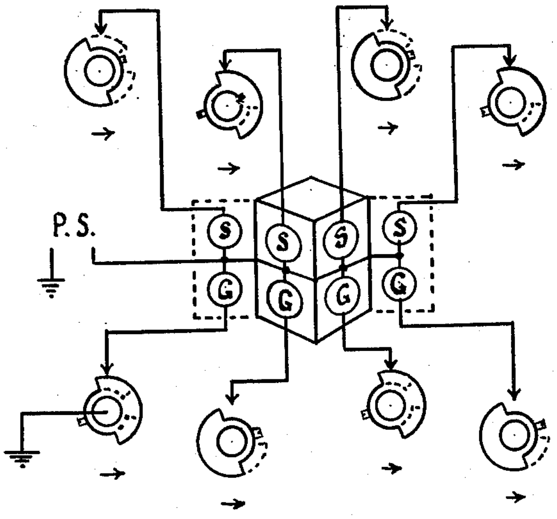

Fig. 13 shows diagrammatically a more elaborate wiring diagram for operating the cams at a particular crossing, as compared with the simpler form of wiring shown in Fig. 10, one of which cams would be considered the leading cam.

Figure 14:
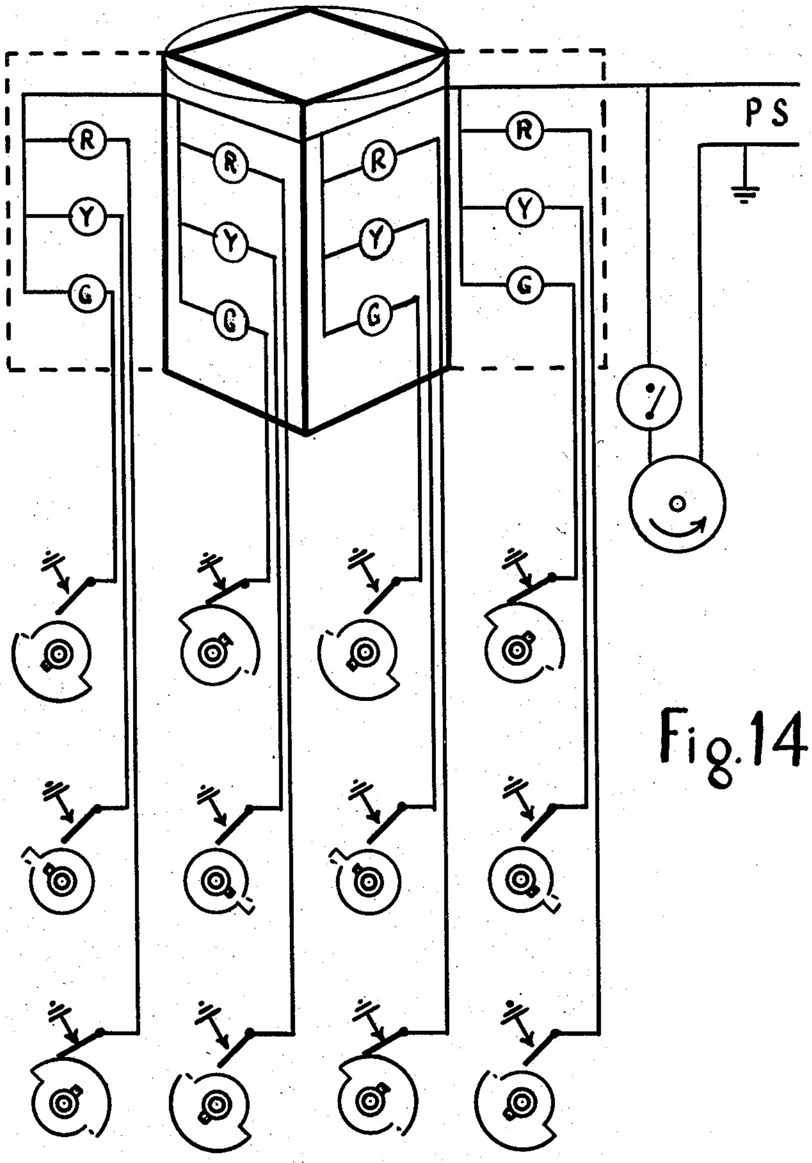

Fig. 14 is a similar schematic drawing of a wiring diagram that could be used at a particular crossing of the type shown in Fig. 13, but in which there is provision made for the showing of intermediate amber or yellow lights.

It will be noted that in Figs. 2, 4, 6, 7 and 8 the small outside arrows denote merely the direction of the traffic whereas the inside arrows in Figs. 1, 3 and 5 designate the progressive platoons on the different roadways. In one brief and simple illustration of the operation of Fig. 1, as shown, for example, the arrangement of platoons of traffic as indicated by the arrows, may be considered to be progressed continually forward passing in true coordination without conflict and with the individual signal displays merely turning from Stop to Go with platoon arrivals. It is apparent that by establishing the signal sequences initially, that the signal would then expedite the platoons in like manner. The time-point position numbers shown, at which the signals repeat their cycle, may, however, provide slightly earlier and longer displays at certain positions and are, therefore, generally preferred.

In Figs. 1 to 4, the time-point position numbers at the crossings indicate that the signals may repeat the cycle on that particular point of time in a similar cycle, so that each of certain crossings may have its signal set to repeat at the first of 8 time-points as at the crossings indicated by the numbers 1, at the second of 8 time-points at the crossings indicated by the number 2, at the third where indicated by the number 3, and proceeding in this manner, so that the signals 1 follow the signals 8 on the following time-point division of the cycle, thus providing a succession of signal starts through the time-point positions numbered 1, 2, 3, 4, 5, 6, 7 and 8, then repeating.

In Figs. 5 to 8, the numbers at the crossings indicate that the signals repeat the cycle in the above manner, but upon 6 divisions of the cycle, for example if the cycle were 60 seconds long, then the signals marked 6 could repeat on each 60th second, as indicated on a watch, and the signals marked 1 could repeat on each 10th second, as indicated on the watch, 2 on each 20th, 3 on each 30th, and in this manner through to 6 again on the 60th second.

If, in utilizing the invention, the adjacent crossings are especially close to one another, the signals may sometimes be made to repeat in simultaneous relation to one another, or if the signals are especially far apart, then certain time-point settings may sometimes be omitted.

In Fig. 9, each box symbolizes a signal in the act of exhibiting its indications of Go and Stop, to favor either the vertical or horizontal direction as the case may be. Fig. 9 also symbolizes the electrical or mechanical actuation of the respective signals through the illustration of cams, to show the relative positions of the leading cams in individual signals, for example the horizontal Go cam, at the identical moment that the signals bearing the time-point "2" are actuated to horizontal Go, in Figs. 1 to 4. If at this instant the leading cams of all signals "2" have just changed their phase to horizontal Go, in repetition of a time cycle, it is apparent that the leading cams of all signals bearing the time-point designation "3" are positioned 45° to the rear, so as to actuate these signals to horizontal Go upon the following ⅛ cycle of time. The leading cams of other signals are similarly offset in time and degree, one from the other. This offset relation is retained as the cams revolve. Fig. 9 thus shows diagrammatically, examples of the relative cam settings, at the different time-point positions 1, 2, 3 and 4, at the moment the "2" position at the upper left hand corner of the Figs. 1 to 4 is being actuated, and at the moment every other "2" position in the said figures is being actuated. Signals at the other locations designated with the time-point position numbers 5 to 8 may be operated similarly by cams positioned to repeat the signaling cycle at the division of time indicated by their particular time-point position number. In turn, each of the leading rotary cams 10, 11, 12 and 13, and the corresponding light positions 14, 15, 16 and 17 may be shifted by the cam surfaces co-acting with any known electrical or mechanical light shifting elements 22, 23, 24 and 25. The cams 10, 11, 12 and 13 are adjustably held by screws 26, 27, 28 and 29 on constant speed shafts 30, 31, 32 and 33, which may be all driven, as in electric clocks, at the same speed from a source of electrical current, for instance an urban electrical alternating current, having a given cycle of alternation. However, any means of coordinating and synchronizing the signals can be used instead, to attain a similar sequential disposition. The spans of the cams may be increased or decreased, as shown for example at 34, Fig. 10. In Fig. 9, one of these signals, comprising Stop and Go lights which change to favor either of the crossing directions, is located at each of the road crossings, each having, for example, a 180° cam to operate the change of the signal, the said cam making a 360° cycle of rotation, for instance in a 60 second time cycle. All of the signals may be constructed to perform so that each may be sequenced to repeat in relation to one of the 8 divisions of the cycle. The leading cam located at its respective crossing may be set manually or otherwise at its particular 45° offset or the motor may be started at the particular instant to effect such an offset. The eight members at the different locations in Figs. 1 to 4 indicate the time-point at which each signal may repeat its cycle in relation to all other signals in a common direction.

Fig. 10 represents an example of electrical means for controlling the signals at one four-cornered crossing, as for example at positions designated with the time-point 3 (as in Fig. 9), there being a power supply P.S., a single cam 12 controlling an electrical light shifting element 24 which co-acts with contacts 35 and 36 to make and break the electrical circuits, so as to energize the vertical Go light at V, G and the horizontal Stop light at H, S, when the element 24 is dropped by the cam 12, and so that when element 24 is raised by the cam 12, the horizontal Go light at H, G and the vertical Stop light at V, S is energized, so that a Go signal may be directed along one of the two roads at a given crossing at a given moment. The proportion of the cycle apportioned to the Go display and then the Stop display may be regulated by the span of the cam 12 as at 34.

Fig. 11 is a schematic diagram representing an electrical means for controlling the signals at a 6 cornered crossing, for example as in Fig. 3, there being three cams 37, 38 and 39 operating the one signal, each cam being adjusted to different degrees of a circle, said cams being adjusted and fixed upon the same shaft 40 driven by a synchronous motor 41, said cams acting upon contact levers 42, 43 and 44, respectively, to operate the lights which face three roads of the crossings so that the lever 42 actuates the horizontal Go light H, G from contact 45, the vertical Stop light V, S from contact 46 and the diagonal Stop light D, S from contact 47, so that lever 43 actuates the horizontal Stop light H, S from contact 48, the vertical Go light V, G from contact 49 and the diagonal Stop light D, S from contact 50 and so that lever 44 actuates the horizontal Stop light H, S from contact 51, the vertical Stop light V, S from contact 52 and the diagonal Go light D, G from contact 53, so that a Go light may be directed to one of three roads of a crossing at a given time. Each similar signal unit may be adjusted to repeat a similar series of displays in relation to its offset in time division according to the time-point at each crossing so that the cam shaft 40 adjustment for a repeating signal in an 8 time-point system is generally 45° removed from the cam shaft position of a signal repeating at a consecutive time-point. A repeating signal in a 6 time-point system, however, generally has its leading cam removed 60° from the repeating position of the cam of a signal repeating at a consecutive time-point. The motor 41 is preferably operated to turn the shaft 40 in a steplike movement in order that approximate adjustment of the cams will produce a simultaneous contact action.

Fig. 12 is like Fig. 9 except that the cams are set differently, but the Fig. 12 symbolizes the cam or leading cam setting at different positions wherein the signals are made to operate so as to repeat on a 6 time-point basis. Thus, the cams spaced substantially at 60° offsets one from another to operate the systems as in Figs. 5 to 8. To institute a 6 time-point or an 8 time-point system simply requires the setting of the signal operating devices, such as cams, to repeat upon one of the 6 or 8 divisions respectively, or at any other offsets selected, so that each signal may be made to repeat its cycle of the same length on its particular offset in relation to the total offset divisions employed in the system.

Fig. 13 employs eight cams to produce the same succession of signals as in Fig. 10, but is constructed with optional variations in spans of the cams and the cam adjustments for special requirements of the individual lights of a signal. Each cam is driven on the same grounded shaft by a synchronous motor.

Fig. 14 shows a more elaborate arrangement of the cams than in Fig. 13, by the inclusion of yellow displays Y operated by cams driven on the same shaft from the motor at the right. The dotted rectangles shown thereon represent the rear portion of the signal. As in the case of Fig. 13, the cam shaft would preferably be driven by a steplike action. The inclusion of displays other than Stop and Go is often considered good practice. It is apparent that the systems will tolerate many minor modifications through adjustments of the different cams on their shafts as well as the spans of the cams without disrupting the coordination of the progressing platoons. Although simple signaling circuits are herein employed to describe the system, more elaborate types of apparatus may obviously be used by operating their signals to repeat their cycles in the prescribed manner.

In the drawings, referring particularly to Figs. 1 to 8, the examples of road systems therein embody signal devices for roads running substantially at right angles to one another, and in certain cases for roads also crossing in an oblique manner, and which, for convenience, may be referred to as being vertical, horizontal and diagonal, respectively. Each signal device is understood to contain at least Go and Stop displays for each particular crossing road, and while additional displays, such as caution, may be included, they will not be considered here in detail. For convenience, in the explanation of my invention, as considered for systems having horizontal and vertical roads only, the description will deal mainly with signal devices which exhibit Go and Stop displays to the crossing directions for equal time phases, each corresponding to the duration of one-half the same chosen signal cycle for all the signals, the selection of equal time phases, however, being arbitrary, in order that comparative appraisals may be made. Similarly, where the description deals with systems comprising horizontal, vertical and diagonal roads, the description will deal mainly with three equal phases of the cycle. Thus, in one phase of the signal, it may display Go to the horizontal direction only and Stop to any other direction, and in a vertical phase of the signal it may display Go to the vertical direction only and Stop to any other direction, and if the system comprises diagonal roads, then a diagonal phase may display Go to the diagonal direction only and Stop to any other, and each signal device may be switched from one position to the other at equal time periods of a half or third of a cycle as the case may be. The signal devices are identified according to the cycle time-points at which they are set in the time cycle when they recurrently switch to a different position in a common direction of traffic, and this applies regardless of the number of phases or displays. The cycling of the signal devices takes into account the time needed for pedestrians to cross an intersection. If the roads are wide, 30 seconds may, for convenience, be considered a minimum amount of time, which means that the Stop display may be on for about 30 seconds for each of two or each of three directions, making a signal cycle of 60 or 90 seconds respectively, this consideration being in accordance with the width of the crossings.

Frequent references are made to conductance values in the description of certain figures. The technicalities of comparison and methods of evaluation are considered following the detail of the figures.

The signals upon the primary one-way roads may overlap one another because of the extended duration of the lights through periods containing several divisions of time. Thus, if the Go period is ½ cycle, then the wave of Go displays may extend through ½ of the signals and the platoon of cars may temporarily fill that portion of the roadway. However, that portion of traffic at the end of a platoon, which may in some cases be positioned between two adjacent lights operating simultaneously, is halted on the turn of a Stop display, so that the saturation factor may be slightly reduced by this amount of distance. It may be considered that trains of traffic progress through these waves of horizontal Go lights and that trains of crossing traffic progress through vertical Go lights of opposite phase while the horizontal lights indicate Stop.

Figure 2:
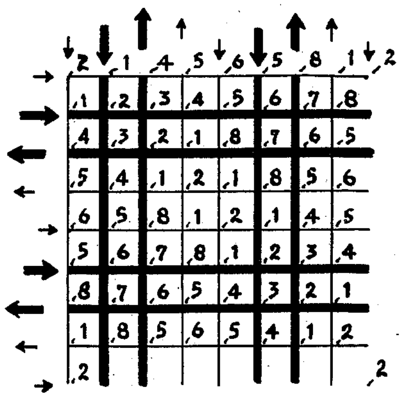
Fig. 2 shows a simple repetitive span of the system as shown in Fig. 1, but without showing the platoons.

Figs. 1 and 2 comprise a system in which the primary and secondary roads are located, so that a system having a high primary and secondary conductance potential, such as 360 comparatively, may be applied to a locality where roadway traffic loads require a different distribution of primary and secondary road arrangements. Each horizontal road may have its permissible vertical counterparts, so that any horizontal road sequence may have a similar vertical sequence operating on an opposite phase. Thus, the top horizontal sequence 2, 1, 4, 5, 6, 5, 8, 1 has, to the left of Fig. 2, a counterpart vertical sequence 2, 1, 4, 5, 6, 5, 8, 1. The second horizontal sequence 1, 2, 3, 4, 5, 6, 7, 8 also has a second vertical counterpart sequence 1, 2, 3, 4, 5, 6, 7, 8. In this manner, each horizontal sequence may have its counterpart operating on an opposite cycle phase. The starting time-point number or the starting position is arbitrary. If the repeating sequence 2, 1, 4, 5, 6, 5, 8, 1, 2, 1, 4, 5 is compared with the sequence upon any secondary road in Fig. 2, in the direction of the arrow, it may be observed that the same sequential progression may be employed on all the secondary roads although the position of start may be different as well as the direction of succession. This secondary sequence, without necessitating separate adjustments for one light of a signal, provides a high degree of automatic restrictive traffic control as employed in this system. For example, all signals except those operating on the underlined numbers 1 and 5 as follows, may signal drivers to conform to proper speeds. Thus, in the sequence 2, $\underline{1}$, 4, 5, 6, $\underline{5}$, 8, 1, 2, $\underline{1}$, 4, 5, the underlined numbers indicate that the lights at these positions may indicate Go a quarter cycle before arrival, as the cars would progress on the consecutive points of time 2, 3, 4, 5, 6, 7, 8, 1, 2, 3, 4, 5. The half cycle grouping may also be noted in the spacing of every fourth number. In order to illustrate the superiority of the secondary sequence mentioned below, a comparison may be made with a second different sequence which is workable but less desirable, the two being as follows with the underlined numbers indicating positions that turn Go ahead of time, and the remaining numbers indicating regulative signals, each sequence commencing with traffic arriving upon the time-point 2:

2, $\underline{1}$, 4, 5, 6, $\underline{5}$, 8, 1, 2, $\underline{1}$, 4, 5

$\underline{1}$, $\underline{1}$, 4, $\underline{4}$, $\underline{5}$, $\underline{5}$, 8, $\underline{8}$, $\underline{1}$, $\underline{1}$, 4, $\underline{4}$ It will be noted that both sequences enable a similar rate of progression but that the first progression, as employed in Figs. 1 and 2, operates with greater automatic restriction than the said second sequence, yet the saturation factor for both sequences is similar in that no setting is advanced more than two time-points. Thus, the former sequence provides more rigid control, while at the same time retaining a similar period apportionment at different points. Therefore, it is apparent that sequences can be modified, yet still fall within the spirit of the invention, and in this connection it is also apparent that modifications may be made in all systems of both this and said co-pending application, but that the methods described are generally the most suitable. The primary sequence of Figs. 1 and 2 is successive and traffic may progress throughout the system as facilitated by the succession of signals. It may further be noted that the system of Figs. 1 and 2 is compatible with the system of Fig. 5 of the said co-pending application, and that if placed side by side or one below the other they may be made to feed through each other, although this may, at certain connections effect an alteration in the saturation factor where primary and secondary roads join.

Figs. 3 and 4 are like Figs. 1 and 2, but with diagonal additions coordinated thereto, so as to enable two-way non-stop traffic thereon. An additional simultaneous relation is also interposed between the secondary diagonals, and Fig. 3 illustrates more than the network of a single repetitive span in order to show continuity. Diagonals in a system produce crossings which may have 6 corners, requiring the displays at such crossings to be directed into the direction of three roads. Although this may ordinarily be considered a disadvantage because an average of only ⅓ rather than ½ of a cycle of time may be employed for the Go period of a given direction at 6 cornered junctions, thereby halting two directions at a time so as to increase the cycle and reduce the total conductance of a network, it is often necessary, nevertheless, that major highways running diagonally through a locality must be given a priority consideration over, and at the expense of, all other roads. This unit system may, therefore, be of value in coordinating a network of roads to one or more diagonal highways, where no alternative is provided.

The signals of the two-way diagonal secondary roads, shown by solid lines, are disposed in half cycle time-point relation as shown at 4, 4, 8, 8, repeating, there also being a crossing diagonal relation in the half cycle series located at 1, 1, 5, 5, repeating. In a strictly conforming design, the speed of through traffic upon these diagonal roads may be equal to:

$$\frac{\sqrt{\text{Speed on horizontal road}^2+\text{speed on vertical road}^2}}{2}$$

The secondary diagonal saturation factor may be that of other secondary roads, that is:

$$\frac{\text{Duration of diagonal Go period of a cycle}}{\text{duration of the complete cycle}}=\frac{1}{4}$$

The primary roads of Figs. 3 and 4, as with other simpler systems, may have no subtraction factor.

The start of the Go period in each of the three directions of horizontal, diagonal and vertical signals may permissibly be consistent at each intersection whether 4 or 6 cornered. At a 4-cornered crossing where the diagonals are non-existent and diagonal displays need not be employed, the signal period occurring before the diagonal period at a given crossing, for example the horizontal Go period in Fig. 11, may operate on an extended span of cam, thereby utilizing the time of both horizontal and diagonal signal periods. In this manner, the start of the Go displays at different time-point positions may be consistent with respect to each phase of a signal, so that the sequential disposition for any direction of traffic may be applied in relation to the horizontal, diagonal or vertical phase of the time-points at 6 cornered crossings, and by two phases at 4-cornered crossings where no diagonal exists. In order not to overly favor the direction of traffic occurring before the diagonal period, the cam may be varied so as to provide other than 120° to each cam at a signal, their total being 360° of operation.

The conforming diagonal relationship that exists may enable possible solutions to certain difficult problems. However, in the planning of new localities or in orienting the streets around a highway, diagonal relationships other than speedways should be avoided as they tend to reduce rather than raise the potential conductance within a community. The many different systems of crossing sets of roads are also adaptable to oblique road arrangements and in this connection it should be noted that if the diagonal and vertical sets of roads in Figs. 3 and 4 were revolved clockwise within the horizontal set, for example, this would appear differently because the diagonals may be revolved beyond diagonal position to a vertical position, yet the same sequential progressions may be applied in the manner best suited to the problem at hand.

Figs. 5 and 6 provide another similar system of coordination which, however, operates in relation to 6 major time-divisions of the cycle instead of 8. It employs the principle of coordinating signals in a network of roads by relating a set of secondary roads, and, further, a second crossing secondary set, so as to interpose a said secondary set within a primary set, one primary set crossing the other; said secondary sets being controlled to progress traffic through signals sequenced to operate on an alternating group basis. In this system, however, an additional alternative to said group basis is provided through a singular alternating, rather than group or plural alternating basis for special purpose, as related. The said primary sets may be controlled by signals, to progress traffic through said signals sequenced to operate in succeeding relation, in such a degree of coordination as to permit non-stop straight movement of traffic throughout the primary and secondary sets of the network.

The time-point numbers denote, and relate to, the ⅙ division of a cycle of time at which the signals repeat their cycle, each signal comprising at least two phases in its said cycle, so as to control both roads of a crossing to permit traffic to go separately in each direction, while stopped in the crossing direction.

This system possesses certain attributes, such as a different distribution of through two-way cross streets which may be compatible with the needs of certain localities requiring this type of arrangement. The systems of Figs. 5, 6, 7 and 8 all work on a 6 time-point cycle basis and may be similarly operated by cams as in Fig. 12, so that the time-point settings may be on an 60° offset one from the other, thereby effecting signal repetition in relation to any particular one of 6 divisions of the cycle according to the time-points denoted at their respective positions in the diagrams.

In Figs. 5 and 6, both the horizontal and vertical roads again possess a permissible counterpart relation, conducting traffic in relation to opposite phases of the cycle. No short display problem exists between either the primary or secondary crossing sets, and in this respect the use of two-way roads as in the diagram may be considered simpler than in cases of some 8 point systems. The one-way primary roads may again employ the simple succession of signals in the direction of moving traffic. The secondary roads may be two-way, with signals progressing on a ½ cycle grouping basis in coordination with the primary crossings so that the sequence 3, *x*, 3, 6, *x*, 6, repeating, may be either 3, 3,3, 6, 6, 6, or 3, 4, 3, 6, 1, 6, repeating, or 3, 6, 3, 6, 3, 6, repeating. The time-point settings designated *x* are especially variable because different results may be attained according to the time-point which solves a specific need as hereinbelow related. It will be noted that in time-point successions as 1, 2, (3), 4, 5, (6), 1, 2, (3), 4, 5, (6), that 3 and 6 are alternate to each other. It is apparent that if *x* in 3, *x*, 3, 6, *x*, 6, occurs on a time-point of the cycle which is opposite to the adjacent time-points, then the resulting secondary sequence 3, 6, 3, 6, 3, 6, is of singular alternating character on a ½ cycle basis, but if *x* is of the same time-point as the adjacent signals, then the sequence 3, 3, 3, 6, 6, 6, repeating, is of alternating group character on a ½ cycle basis, wherein the distance that traffic travels in the time of one cycle is 3 times the first aforementioned singular sequence, and, further, that if *x* is one time-point greater than the adjacent time-points then the sequence 3, 4, 3, 6, 1, 6, repeating, improves the alternating group sequence, because the center time-point of each group, being increased ⅙ cycle above the adjacent time-points, may establish additional regulatory control positions in each of 4 directions, at points marked *x*. Thus, traffic may be restrained to conforming rates at the first two positions of any group in the direction of travel or at each time-point position in the first said sequence of singular alternating character.

The saturation factor of the secondary series 3, 6, 3, 6, 3, 6, may be considered approximately that of the primary roads, that is:

$$\text{Saturation factor}=\frac{\text{Duration of Go period of a cycle}}{\text{Duration of the complete cycle}}$$

The saturation factor of the series 3, 3, 3, 6, 6, 6, or 3, 4, 3, 6, 1, 6, may be considered approximately:

$$\frac{\text{Duration of Go period of a cycle}}{\text{Duration of the complete cycle}}=\frac{1}{3}$$

because certain signals which operate similarly with each other are 2 blocks apart, which is ⅓ of the 6-block repetitive span, where the secondary roads cross primary roads.

It is an attribute of these particular secondary road systems that, where the cycle is apportioned 50% each to horizontal and vertical Go traffic, the conductance under load may remain substantially similar whether secondary roads are employed with time-points in singular-alternating or group-alternating application because the series 3, 6, 3, 6, 3, 6, enables ⅓ the speed and about 3 times the saturation through closer platoons as does the series 3, 3, 3, 6, 6, 6, or 3, 4, 3, 6, 1, 6, which in turn conforms to primary speed. It is accordingly apparent that this relation may take into consideration the requirements of school streets, play streets, hospital streets or other streets requiring slow movement of traffic in certain areas. For example, if the system were applied to localities wherein the blocks were 440 ft. square, road center to road center, a 60 second cycle would facilitate system speeds throughout at 30 m.p.h. except that special slow secondary progressive two-way streets could be restricted to 10 miles per hour at the certain blocks desired, in such a manner that so-called "bottlenecks" would not be created, because of the gain in the saturation factor. Such an example is shown in Fig. 5 at the lower part of the figure, and is shaded with dots.

The total comparative conductance per square mile of the Figs. 5 and 6, with 60 second cycles and equal apportionment to horizontal and vertical Go periods may be considered approximately:

| | |
|---|---|
| Horizontal primary roads | 120 |
| Horizontal secondary roads with subtraction factor of ⅓ | 20 |
| Vertical primary roads | 120 |
| Vertical secondary roads with subtraction factor of ⅓ | 20 |
| Total | 280 |

Fig. 5 also shows, at the corners of the block-side-walks, peninsula-like protrusions or extensions. It is apparent that the parking of cars to the side of a road has the effect of reducing the width of the traveled part of the road. However, the pedestrian, whose time to make a crossing is measured in terms of seconds, is ordinarily required to traverse the full road width, which includes a substantial percentage of distance occupied by cars parked along both sides of the road. The longer time cycle required to compensate for this factor may reduce the conductance of a progressive network system. Curb extensions at the corners, as symbolized in Fig. 5, may be utilized to further promote increased conductance of the system, while providing additional safety to the pedestrian, by permitting shorter time cycles than attainable without such pedestrian peninsulas. Conductance is also enhanced by the presence of the peninsulas by providing spaces for bus stops, taxi stands, loading areas and parking, in a manner not to obstruct the progressing platoons of vehicles, by providing separation of the moving vehicles from those not in transit, and by bringing the pedestrian closer to an opposite corner. The pedestrian's visibility is also enhanced thereby.

Fig. 7 represents two units, as in Fig. 6, wherein one unit is superposed to the right together with another, the roads thereby outlining blocks which are substantially oblong rather than square. The sequential disposition is similar to Figs. 5 and 6, except that each time-point is associated with two crossings rather than one, this manner of use enabling greater speed to be attained, or utilization with smaller blocks, or the allotting of greater time for the safety of pedestrians through use of a longer cycle, or allowing use of wider roads which require a longer cycle.

The total comparative conductance of the system with 60 second cycles and equal periods for the horizontal and vertical traffic may be considered:

| | |
|---|---|
| Horizontal primaries, with a subtraction factor of $\frac{1}{12}$ | 100 |
| Horizontal secondaries, with a subtraction factor of $\frac{5}{12}$ | 10 |
| Vertical primaries | 240 |
| Vertical secondaries, with a subtraction factor of ⅓ | 40 |
| Total | 390 |

The horizontal conductance may be increased and the vertical conductance reduced by providing a greater proportionate duration of time to the horizontal Go period of the cycle, there being an altered total conductance as a result.

Fig. 8 represents two units, as in Fig. 6, wherein one unit is superposed diagonally together with another, the roads thereby outlining blocks which are again substantially square. The sequential disposition is again similar to Fig. 6, except that each time-point is associated with four adjacent crossings rather than one crossing. The comparative conductance of the system with a 60 second cycle apportioned 30 seconds each to horizontal and vertical Go periods is:

| | |
|---|---|
| Horizontal primaries with a subtraction factior of $\frac{1}{12}$ | 200 |
| Horizontal secondaries with a subtraction factor of $\frac{5}{12}$ | 20 |
| Vertical primaries with a subtraction factor of $\frac{1}{12}$ | 200 |
| Vertical secondaries with a subtraction factor of $\frac{5}{12}$ | 20 |
| Total conductance | 440 |

In uniform systems, the signals may operate in relation to platoon positions, and further, in irregular localities it must also follow that if signal settings are modified to operate similarly in relation to platoon positions and that if traffic synchronization is of a substantially similar nature of platoon successions, that the same principle is then being administered.

It is intended that this and other such deviations of minor character may still fall within the spirit of the invention.

In the foregoing description of Figs. 1 to 6, it will be noted that, upon any primary road at a given moment, there are a number of time-point positions which display Go to the traffic upon that road. This number of time-point positions, in uniform application, may be a proportion of the total number of time-point positions and may be considered equal to:

$$\frac{\text{Duration of the Go period of a cycle}}{\text{Duration of the complete cycle}}$$

so that the signals progress as a wave. For example, if each of the signals in Figs. 1 and 2 were in a vertical Go position ⅔ of the time rather than ½, then it follows that the signals are also in a Go position extending through a ⅔ distance of the vertical road repetitive span and a green wave of lights may move as a group, within which there may be a platoon of moving cars. Between said green waves there may progress a red wave which could occupy the remaining ⅓ of the repetitive span of signals. It would also follow then that each horizontal Go signal could have a duration of ⅓ of the cycle of time and the horizontal Go displays could extend through ⅓ of the repetitive span distance. The saturation factor relates to the above said duration equation except that where two or more adjacent signals are made to recur on similar divisions of time, a fraction is subtracted. This subtraction factor may employ as the numerator the distance between opposite ends of a similar group of signals, and as the denominator the distance of the repetitive signal span, because at the turn of a signal, cars in this area may be stopped, and because this fraction is also a time fraction with respect to the time it takes to travel either the numerator or denominator distance. The secondary road relation to the primary roads is such that the alternating wave of pairs of same-number time-points may be interposed with non-conflicting and conforming signals, and the changing lights may not appear as readily associated with the wavelike character as upon primary roads, because, in unmodified form, certain displays may start ahead of time to produce a less regular sequence. The platoons of traffic which progress through these secondary signals are reduced in length at certain signals and this reduction relates to the subtraction factor. The subtraction factor is generally greater than upon the primary roads and should be considered in determining the proportion of the cycle allowed for the vertical and horizontal Go displays. For example, if, in a given case upon a secondary road, the signals through ⅓ of the repetitive span are operated simultaneously, it may not be judicious to reduce the Go period in that direction to a ⅓ proportion of the cycle, because saturation, insofar as through non-stop traffic is concerned, might be nil, and continuous progression could be lost. Accordingly, the 8 point systems generally permit wider deviation from 50% period apportionment than do the 6 point systems, and the singular systems, as in Fig. 6, may permit a wider deviation than dual systems, as in Figs. 7 and 8. The saturation factor can be considered in relation to either time or distance. It takes into consideration the approximate percentage of the roadway which can be theoretically occupied by non-stop through traffic, which factor may be considered similar to the percentage of the time cycle continuously available to the Go traffic upon a given road. For purposes of conductance analysis, the saturation potential for any road may be considered:

$$\frac{\text{Duration of Go period of cycle}}{\text{Duration of complete cycle}} - \text{The subtraction factor}$$

A second factor in the analysis is the speed of traffic. The speed between the corresponding time-point positions of two adjacent repetitive spans of signals, as for example from a time-point position 2 through to a similar time-point position 2 in a following cycle group, is found to be equal to the distance between them divided by the length of time in one cycle. In Figs. 1 to 4, for example, the distance could be measured from a first signal number 2 to the next similarly repeating corresponding signal number 2 in the following repetitive span 8 blocks to the right. If the blocks are 20 to the mile, then 8 blocks would equal 2112 ft. If this distance is traveled in a 45 second cycle, the speed would be 32 miles per hour as follows:

$$\frac{2112\text{ (ft.)}}{45\text{ (seconds)}} \times \frac{3600\text{ (seconds per hour)}}{5280\text{ (ft. per mile)}} = 32\text{ miles per hour}$$

A third factor in the analysis is the number of roads within each square mile. In this respect it is suggested that where there are not a whole number of repetitive systems within a running mile, that is to say a fractional number, one system multiplied by the number of and fraction of systems should be employed so as to consider a proper proportion of primary and secondary conductances.

The conductance of any system may be considered to be the total of the conductances upon all roads. The conductance of each road may be derived from the formula:

Speed times the saturation factor.

In the analysis of any signal network system with a given cycle, for example 60 seconds, this method of evaluation is such that the expansion or contraction of the repetitive spans of system to fit within a given area produces the same conductance, because upon the expansion of the distances there is a faster speed and there are fewer roads, and because upon contraction of the distances there is a slower speed and there are more roads within the same given area, and, further, because in both cases the number of roads multiplied by the speed is equal while the saturation factor remains of the same proportion. Thus, in the analysis of any kind of progressive system, its utility can be estimated by a common standard as above, regardless of road concentration, and by the further application of this principle different systems can be compared.

In a uniform block arrangement, the conductance ratings specified for the Figs. 1, 5, 7 and 8 may be considered the comparative ratings regardless of the road concentration within a given square mile, where 60 second time cycles are employed, with equal horizontal and vertical division of the cycle, with respect to progressive through traffic upon primary and secondary roads. Thus, if Fig. 7 were employed, in a square mile having one or several of the Fig. 7 repetitive spans or fractions thereof in the square mile, the total potential and hypothetical amount of horizontal through progressive traffic which may pass a vertical line plus the total potential amount of vertical traffic to pass through a horizontal line in one hour, may be considered equal to one road-wide platoon of cars 390 miles long. If there are 20 short blocks to the mile, then 1⅔ repetitive spans would fit within the mile and a rating could be derived as follows:

| Number of roads | | × | Speed | × | Saturation factor | = | Conductance |
|---|---|---|---|---|---|---|---|
| Horizontal primaries | 4×1⅔ | × | 36 | × | (1/2−1/12) | = | 100 |
| Horizontal secondaries | 2×1⅔ | × | 36 | × | (1/2−5/12) | = | 10 |
| Vertical primaries | 8×1⅔ | × | 36 | × | 1/2 | = | 240 |
| Vertical secondaries | 4×1⅔ | × | 36 | × | (1/2−1/3) | = | 40 |
| Total conductance equals | | | | | | | 390 |

It should be understood that such a rating would vary with the changing shape of blocks and that uniform areas are uncommon, and, further, that each locality has its own particular problem and, therefore, a system of exceptional conductance may not be desirable for that reason alone, or it may not be practical to utilize its great conductance potential to advantage, due, for example, to the necessity of modifying its length of cycle. In this regard the application of a high conductance dual type system, that is with roads in pairs, as in Fig. 7, to a locality where it provides greater speed on a 60 second cycle than is desired, may effect a reduced conductance by requiring a longer cycle. It is therefore necessary that conductance be considered in relation to specific utilization. For example, if a particular 8 time-point system supplied a speed of 24 miles per hour on a 60 second cycle, to a given area having 20 short blocks to the mile, to produce a conductance of 300 (for example Fig. 1 of said co-pending application), then the dual type, Fig. 7 operating on a 6 time-point system, also on a 60 second cycle, would produce a speed of 36 miles per hour with a conductance of 390. But, if it is decided that 24 miles per hour is the desired speed and if, then, this, Fig. 7, six point dual type system is operated on a 90 second time cycle in order to reduce the speed to 24, then the conductance would be only 260, which is below that of the particular said 8 time-point singular type system. Therefore, if the longer cycle is not beneficial to the pedestrian, the greater utility of the Fig. 7 system could be considered wasted by the long cycle, low conductance application, of a system having a potential of high conductance. The limited conductance considerations as described do not take into consideration all factors, for example it is commonly known that the conductance and safety upon one-way roads is notably greater than upon two-way roads, there being far greater car capacity, travel continuity and less turn and parking obstruction on one-way roads. It may also be considered that the conductance on a primary and a secondary road may be equal during periods of light traffic because the saturation factor does not come into consideration. It may also be determination that a fire engine traveling a zig-zag course through the system toward a destination located diagonal to its station, may in some cases, by the driver's knowledge of the system, travel at greatly increased speeds by making an angular turn onto another primary road whenever it reaches the leading progressive signal, because at such a turn it must enter toward a lagging progressive signal. It then, again, attains speed to catch the leading signal, whereupon it may again repeat the procedure, this being accomplished without special equipment or interference from crossing traffic.

The comparative traffic speeds of the different figures, operating under a certain given set of conditions having 20 short blocks to the mile and operating on 60 second cycles, would be:

| | M.p.h. |
|---|---|
| Fig. 5 which operates on a 6 time-point basis | 18 |
| Fig. 1 operating on an 8 time-point basis | 24 |
| Figs. 7 and 8 operating on a 6 time-point basis | 36 |

Accordingly, it may be said that if the 60 second cycles are desired, then the singular examples of the first two categories above may conveniently be considered, also, where the blocks are larger and the traffic speeds, therefore, correspondingly greater, and that the dual type examples of the third category may be conveniently adopted where small blocks would otherwise restrict speed, or where certain irregularities produce an arrangement which is compatible with dual system applications in which certain sequential dispositions are omitted where roads do not exist, or, further, that if cycles longer than 60 seconds are desired, the speeds are thereby reduced. It is accordingly apparent that these considerations and all interrelationships should be given due consideration and study in utilizing the progressive network in any locality.

The conductance ratings herein are presented mainly for purposes of guidance. They are not meant to be invariable, final or binding. Irregularities of design, varying traffic loads and breakdown levels on different roads of a locality provide a few examples of reasons why conductance charts cannot be used to present an inflexible analysis. The ratings rather suggest a standard of comparison and may in this way provide a basis for determining which system of the invention may be best applied to a given locality and how the one selected may be best utilized.

In many cities the preponderance of traffic may travel either in an uptown and downtown direction, or else in a crosstown direction. In such cases an unequal division of opposite phases of the cycle to the crossing light displays is usually desirable. For example, it may be desired that the signals operate on a 90 second cycle with 55 seconds favoring the uptown and downtown traffic and 35 seconds favoring the crosstown traffic. Although any change in the signal time cycle length would alter the traffic speed, a change in the proportion of the cycle apportioned to different phases does not change the speed but does enable greater saturation to be attained in the favored direction with correspondingly longer platoons and, thus, greater conductance in that direction. Fig. 10 illustrates a cam arrangement for one signal. Changing the span of the cam as at 34 at the one signal and also at every other signal in a like manner would effect a heavier conductance in the favored direction by producing unequal opposite phases. This consideration should not be confused with the offset division at which a signal repeats its complete cycle. The 8 time-point systems without diagonals, generally allow a greater deviation from equal division of the cycle to crossing signal phases than do the 6 time-point systems, before loss of secondary progression. Shortening the time cycle increases the system-wide speed.

As indicated by the previously mentioned subtraction factors, the secondary conductance of the 6 point systems may be generally more restrictive than in the case of the 8 point systems.

It is apparent that the signal settings in different examples may be modified in Figs. 1 to 8 in the following manner: The platoon successions in these figures are disposed throughout the network with respect to the primary and secondary road basis and the time-division basis. However, it should be noted that if deviations therefrom occur, the juxtaposition of the primary and secondary through platoons, as well as their successions, may be identified with the primary and secondary road basis, and the time-division basis by the platoon interrelations. Briefly, in heavy traffic the flow of progressing through-platoons upon the secondary roads may be juxtaposed substantially to the side of the longer primary platoons upon the nearest primary road of the similar vehicle direction considered upon the said secondary road, whether the secondary road is one or two-way. In saturated traffic, the front of the platoons of traffic on the primary roads, may repeatedly pass near the ends of the crossing primary platoons, that is to say the traffic of one phase may cross behind that of an opposite phase.

It should be noted that the system may be applied in small portions of the repetitive spans or in any extension of the same and, further, that a particular road may not exist or additional roads may exist or that the road arrangements may be distorted. Two-way flows for short distances on primaries are of course possible in signaling interval overlaps. Also, the use of a second direction non-progressive or random flow upon a primary would not serve to avoid the invention if the non-stop operating relations and procedures shown were employed.

Inasmuch as the actual conditions of road arrangements in which to apply the progressive networks vary considerably, modifications of my invention may be made according to the various street directions, irregularities, proportions, dimensions and particular traffic problems. It is, accordingly, apparent that the examples and illustrations given hereinabove are not meant to be limitations of the invention but are presented for the purpose of illustration and clarification, in order that others skilled in the art can apply the same in use and so as to modify the same when desirable, as may be best suited to the conditions of the particular road system adopted.

I claim:

1. The process which comprises, establishing a flow of solely one-way vehicular traffic on two sets of roads, which are primaries and are located in pairs, on which the traffic runs in opposite one-way directions to each other in each pair in one set and in relatively different opposite directions to each other in the pairs in the crossing set, and in which the traffic on alternating primaries in both sets runs in opposite one-way directions, having also a set of roads which are secondaries, in which set each secondary is at the side of a primary and of which set at least one secondary is between successive primaries having oppositely moving traffic on the respective successive said primaries, said secondary set having also a secondary road crossing the first said secondary set, establishing a flow of traffic on said secondaries, and controlling the flow of traffic crossing on said primary and secondary roads by maintaining on each of the roads vehicular groups which advance continuously as non-stop traffic on all the primary and secondary roads.

2. The process as in claim 1, in which said groups advance in a succession of equal time divisions for the respective vehicular groups, which time divisions continually recur in each set of roads in a ⅙ division of a time-unit cycle.

3. The process as in claim 1, in which said secondaries have solely two-way vehicular traffic.

4. The process as in claim 1 in which the traffic flow established upon the said primaries, during one interval of the time cycle at each primary-secondary crossing point, is followed at that point by a remaining time interval of the cycle across the same primary in the opposite phase of the said cycle, which time cycling through successive said primary-secondary points upon secondaries, is compatible with possible two-way progression upon each secondary irrespective of the directional movement established for traffic upon the secondary road.

5. The process of cyclically progressing vehicular traffic to proceed simultaneously in at least four vehicular directions in a network of primary and secondary roads, herein termed primaries and secondaries, comprising two sets of crossing primaries, having roads located in pairs, in each of which pairs the vehicles on adjacent primaries run in opposite one-way directions to each other in one set and in relatively different opposite directions to each other in the pairs of the crossing set, having also two-way compatible secondaries at the side of primaries of both said primary sets, including a set of secondaries of which each secondary is located at the side of a primary, and of which set at least one secondary is between primaries having oppositely moving one-way traffic, establishing a flow of traffic on said primaries and secondaries, and controlling the flow of traffic crossing on said primaries and secondaries by maintaining vehicular groups on each of the roads, which advance continuously as non-stop traffic on all the primary and secondary roads, in a succession of equal time divisions for the respective vehicular groups in all primary and secondary roads in a ⅙ division of a time-unit cycle.

6. The process of cyclically progressing vehicular traffic to proceed simultaneously in at least four vehicular directions in a network of primary and secondary roads, herein termed primaries and secondaries, comprising two sets of crossing primaries, having roads located in pairs, in each of which pairs the vehicles on adjacent primaries run in opposite one-way directions to each other in one set and in relatively different opposite directions to each other in the pairs of the crossing set, having also two-way compatible secondaries at the side of primaries of both said primary sets, including a set of secondaries of which each secondary is located at the side of a primary, and of which set at least one secondary is between primaries having oppositely moving one-way traffic, establishing a flow of traffic on said primaries and secondaries, and controlling the flow of traffic crossing on said primaries and secondaries by maintaining vehicular groups on each of the roads, which advance continuously as non-stop traffic on all the primary and secondary roads, in a succession of equal time divisions for the respective vehicular groups in all primary roads in a ⅙ division of a time-unit cycle, in a succession of equal time divisions for the respective vehicular groups in high speed areas in secondary roads in a ⅙ division of a time-unit cycle, and in a succession of equal time divisions for the respective vehicular groups in low speed areas in secondary roads in a ⅜ division of a time-unit cycle.

7. The process of cycling vehicular traffic to proceed progressively in at least four vehicular directions in a network of primary and secondary roads, herein termed primaries and secondaries, comprising two sets of crossing primaries having roads grouped in pairs, in each of which pairs the traffic on adjacent primaries runs in opposite one-way directions to each other in one set and in relatively different opposite directions to each other in the pair in the crossing set, comprising two sets of crossing secondaries having roads grouped in pairs located to the side of primary pairs and of which at least one secondary pair in one said secondary set is between two primary pairs, in each of which pairs the traffic on adjacent secondaries flows in opposite one-way directions to each other in one set and in relatively different opposite directions to each other in the pair in the crossing set, with the traffic on adjacent primaries and secondaries flowing in the same directions, establishing a flow of traffic on said primaries and secondaries, and controlling the flow of traffic crossing on said primaries and secondaries by maintaining vehicular groups on each of the roads, which advance continuously as non-stop traffic on all the primary and secondary roads, in a succession of equal time divisions for the respective vehicular groups, which time divisions continually recur in each set of roads in a ⅙ division of a time-unit cycle.

8. The process as in claim 7, in which the traffic flow established upon the said primaries, during one interval of the time cycle at each primary-secondary crossing point, also successively establishes a time interval across the same primary in the opposite phase of the said cycle, which time cycling through successive said primary-secondary points upon secondaries is compatible with solely one-way progression upon each secondary road.

9. The process of cyclically progressing vehicular traffic to proceed simultaneously in at least four vehicular directions in a network of primary and secondary roads, herein termed primaries and secondaries, comprising two sets of crossing primaries having roads located in pairs, in each of which pairs the traffic on adjacent primaries runs in opposite one-way directions to each other in one set and in relatively different opposite directions to each other in the pairs of the crossing set, having also two-way compatible secondaries at the side of primaries of both said primary sets, including a set of secondaries of which each secondary is located at the side of a primary and of which set at least one secondary is between primaries having oppositely moving one-way traffic, comprising the establishing of flows of successive crossing traffic at road crossings, in selected apportionments of a time cycle, and the maintaining of traffic flow through successive crossing positions along each road, in substantially ⅙ time cycle steps, by establishing a first traffic cycling sequence having selected apportionments to crossing directions, at a first primary-primary crossing position, establishing at succeeding and preceding primary and secondary crossing positions along the first two crossing primaries, according to the prescribed one-way directions of traffic, the repeated cycling of traffic to recur substantially ⅙ time cycle later for each succeeding step forward from the said first crossing position, in cycle with ⅚ time cycle later for each preceding step backward, and ⅙ time cycle later from the closest opposite direction primary of one pair to the closest of the next primary pair, also proceeding from the aforementioned traffic cycling established along and across the said first two crossing one-way primaries, the continued repeated cycling of traffic at succeeding and preceding positions along other primaries, at substantially ⅙ time cycle later for each succeeding step forward, in cycle with ⅚ time cycle later for each preceding step backward, also proceeding from the aforementioned cycling thus established along and across the primaries, the continued repeated cycling of traffic at points where secondaries cross each other, at substantially ⅙ time cycle later in the direction of travel from the preceding primary-secondary crossings.

10. The method of cycling vehicular traffic to proceed progressively in at least four vehicular directions in a network of primary and secondary roads, herein termed primaries and secondaries, comprising two sets of crossing primaries having roads located in pairs, in each of which pairs the vehicles on adjacent primaries run in opposite one-way directions to each other in one set and in relatively different opposite directions to each other in the crossing set, having also secondaries to the side of primaries of both said primary sets including a set of secondaries, of which set each secondary is located at the side of a primary, and of which set at least one secondary is between primaries having oppositely moving one-way traffic, comprising the repeating of signal indications at selected apportionments of a time cycle from Go to Stop and vice versa at selected crossing positions of the roads, which cycling indications begin with the same point in signaling sequence from a first point of two crossing primaries, to recur substantially 1/6 cycle later in time for each step forward in the prescribed directions of the one-way primaries and substantially 5/6 cycle later in time for each step backward from position to position in the said four vehicular directions throughout the primaries which also cross the said secondaries, the same being in single steps from primaries to crossing points of adjacent opposite direction primaries of the same pair, also in single steps from primaries to adjacent secondaries and in double steps from points of the closest primary of one pair to the nearest opposite direction primary of the next pair, the cycling basis thus provided along the secondaries at crossing positions with primaries being compatible with possible two-way progression independent of the traffic directions prescribed along the secondaries.

11. The process according to claim 10, comprising also the cycling of signal indications which begin and recur at points of crossing secondaries within 1/6 cycle later in time than at the preceding primary-secondary position facilitating traffic speeds substantially the same as the speed upon substantially parallel adjacent primaries, and at other crossings of secondaries at 3/6 cycle later in time than at the preceding primary-secondary position restricting traffic in slow zones to 1/3 the just mentioned progressive speed.

12. The process of cyclically progressing vehicular traffic to proceed simultaneously in at least four vehicular directions in a network of primary and secondary roads herein termed primaries and secondaries, comprising two sets of crossing primaries having roads grouped in pairs, in each of which pairs the vehicles on adjacent primaries run in opposite one-way directions to each other in one set and in relatively different opposite directions to each other in the pairs in the crossing set, comprising two sets of crossing secondaries having roads grouped in pairs located at the side of primary pairs and of which at least one secondary pair in one said secondary set is between two primary pairs, in each of which pairs the vehicles on adjacent secondaries flow in opposite one-way directions to each other in one set and in relatively different opposite directions to each other in the pair in the crossing set, with the vehicles on adjacent primaries and secondaries flowing in the same directions, comprising the establishing of flows of successive crossing traffic at road crossings, in selected apportionment in a time cycle, and the maintaining of traffic flow through successive positions along each road, in substantially 1/8 time cycle steps, establishing at succeeding and preceding positions along the first two crossing primaries, according to the prescribed one-way directions of traffic, the cycling of traffic repeated substantially 1/8 cycle later for each succeeding step forward from the said first crossing position, in cycle with 7/8 time cycle later for each preceding step backward, the number of steps being three from the closest opposite direction primary of one pair to the nearest of the next primary pair, also proceeding from the aforementioned traffic cycling thus established along and across the first two crossing primaries, the continued cycling of traffic repeated at suceeding and preceding positions along other primaries, according to the prescribed direction of one-way traffic, at substantially 1/8 cycle later for each succeeding step forward, in cycle with 7/8 time cycle later for each preceding step backward, also proceeding from the aforementioned cycling thus established along and across the primaries, the continued cycling of traffic repeated at points where secondaries cross, at substantially 1/8 time cycle later for each step forward in the direction of travel from the preceding primary-secondary crossings.

13. The method of expediting vehicular traffic to proceed progressively in at least four vehicular directions in a network of primary and secondary roads herein termed primaries and secondaries, comprising two sets of crossing primaries grouped in pairs, in each of which pairs the vehicles on adjacent primaries run in opposite one-way directions to each other in one set and in relatively different opposite directions to each other in the crossing set, comprising two sets of crossing secondaries located in pairs to the side of primary pairs and of which at least one secondary pair is located between two primary pairs, in each of which pairs the vehicles on adjacent secondaries flow in opposite one-way directions to each other in one set and in relatively different opposite directions to each other in the crossing set, with the vehicles on adjacent primaries and secondaries flowing in the same directions, comprising the repeating of signal indications at selected apportionments of a time cycle, from Go to Stop and vice versa at selected crossing positions of the roadways, which cycling indications begin with the same cycle point along the primaries of the said four vehicular directions, from a first point of two crossing primaries, recurring substantially 1/8 cycle later in time for each step forward in the prescribed directions of the one-way primaries, and substantially 7/8 cycle later in time for each step backward from position to position in the said four directions throughout the primaries which also cross said secondaries, and subsequently in substantially 1/8 cycle steps along the one-way secondaries in a forward direction to remaining positions of crossing secondaries until signaling sequences at all selected positions are in cycle, the same being in triple steps along primaries from the closest primary of one pair to the nearest opposite direction primary of the next separated pair, also in single steps along primaries to points of adjacent opposite one-way primaries of the same pair, and from primaries to points of adjacent same direction secondaries, and from secondaries to adjacent same direction primaries, and also in single steps along secondaries in their one-way prescribed directions from primaries to adjacent secondaries and from secondaries to adjacent secondaries.

14. The process which comprises establishing flows of vehicular traffic on primary and secondary sets of roads including a pair of adjacent opposite direction, solely one-way primaries, having a secondary located to each side of the primary pair, crossed by a secondary located between opposite direction solely one-way non-adjacent roads, said roads being primaries in which traffic is directed in opposite one-way directions relatively similar to the said pair of adjacent primaries being crossed, and controlling the flow of traffic crossing on the primaries and secondaries by maintaining on each of the roads, separated vehicular groups which advance continuously as non-stop traffic on all the primary and secondary roads.

15. The process as in claim 14 in a succession of proportionate time divisions of a time-unit cycle for the respective vehicular traffic groups, which time divisions continually recur in each set of roads in a 1/6 division of said time-unit cycle, and in which the said secondaries are compatible with two-way vehicular flow irrespective of the directional movement for traffic thereon.

16. The process as in claim 14 in a succession of proportionate time divisions of a time-unit cycle for the respective vehicular traffic groups, which time divisions continually recur in each set of roads in a 1/8 division of a time-unit cycle, and in which a pair of secondaries is established between the primaries having secondary intervention, each secondary road being compatible with solely one-way vehicular flow in the same direction as that of the nearest parallel primary irrespective of the directional movement of traffic thereon.

17. The process according to claim 14, including the establishment of coordinated flow of traffic upon a road diagonal to the said primary and secondary roads by the three phase cycling of traffic at intersections of the said diagonal with crossings of other said roads.

18. The process in accordance with claim 14, there being, also, peninsular extensions at corners of crossing roads, and establishing a quicker walking interval in a shorter crossing distance for a given time cycle length.

19. The process as in claim 15, including adjacent primary pairs of like direction, and adjacent secondary pairs of roads, which secondary roads run individually with two-way traffic, or in either direction with one-way traffic, and establishing the flow of traffic across the pairs in 1/6 cycle steps from pair to pair or in 1/12 steps from road to road.

20. The process as in claim 14 in which traffic control sequences along secondaries relate to opposite direction equivalents as distinguished from extremes, coordinated with controls along each primary sequenced in opposite direction extremes.

21. The process as in claim 14 in which traffic control sequences along secondaries relate to opposite direction equivalents, coordinated with controls along primaries sequenced in $$\frac{1}{n}$$

divisions of a cycle in a direction of predominant flow, complemented in cycling to $$\frac{n-1}{n}$$

in the opposite direction, $n$ being 6 or a multiple thereof.

22. The process as in claim 14 in which traffic control sequences along secondaries relate to opposite direction equivalents, coordinated with controls along primaries sequenced in $$\frac{1}{n}$$

divisions of a cycle in a direction of predominant flow, complemented in cycling to $$\frac{n-1}{n}$$

in the opposite direction, $n$ being 8.

23. The process as in claim 21, wherein in addition to the said solely one-way vehicular traffic which remains predominant, obtaining multiband progression and substantially-like two-way traffic speed in opposite directions of one crossing direction, on a given primary road, by a signaling cycle, split to crossing Go intervals of under $$\frac{2}{n}$$

across the given primary, crossed by more than $$\frac{n-2}{n}$$

along the given primary, $n$ being 6.

24. The process as in claim 1, in which primary traffic bands are established to the side of secondary bands, greater in length by substantially 2 parts of a 6 time unit cycle than the secondary bands.

25. The process as in claim 1, in which primary traffic bands are established to the side of secondary bands, greater in length by substantially 2 parts of an 8 time unit cycle than the secondary bands.

UNITED STATES PATENTS

References Cited in the file of this patent

| | | |
|---|---|---|
| 2,082,479 | Buerke | June 1, 1937 |
| 2,604,525 | Zannettos | July 22, 1952 |

OTHER REFERENCES

"American City," May 1927, pp. 611 to 615.

UNITED STATES PATENT OFFICE

CERTIFICATE OF CORRECTION

Patent No. 2,926,333 February 23, 1960

John K. Masten

It is hereby certified that error appears in the printed specification of the above numbered patent requiring correction and that the said Letters Patent should read as corrected below.

Column 3, line 49, for "vericles" read -- vehicles --; column 6, line 6, for "members" read -- numbers --; line 63, after "another" insert a comma; same line, strike out "to", first occurrence; column 12, line 21, indent "The horizontal conductance" to show that this is the beginning of a new paragraph.

Signed and sealed this 6th day of September 1960.

(SEAL)
Attest:

ERNEST W. SWIDER
Attesting Officer

ROBERT C. WATSON
Commissioner of Patents